United States Patent [19]

Logan et al.

[11] Patent Number: 4,673,242

[45] Date of Patent: Jun. 16, 1987

[54] MOVABLE CLOSURE FOR OPTICAL ELEMENTS

[75] Inventors: Maurus C. Logan, Elizabeth; Francis Sladen, Neshanic Station, both of N.J.

[73] Assignee: Thomas & Betts Corporation, Raritan, N.J.

[21] Appl. No.: 657,908

[22] Filed: Oct. 5, 1984

Related U.S. Application Data

[63] Continuation of Ser. No. 332,716, Dec. 21, 1981.

[51] Int. Cl.⁴ .................................................. G02B 6/36
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 4,277,135 | 7/1981 | Schrott et al. | 350/96.21 |
| 4,378,145 | 3/1983 | Stancati et al. | 350/96.21 |
| 4,411,491 | 10/1983 | Larkin et al. | 350/96.21 |

FOREIGN PATENT DOCUMENTS 111905 8/1980 Japan ................................ 350/96.20

OTHER PUBLICATIONS

Noel et al., IBM Technical Disclosure Bulletin, vol. 22, No. 6, Nov. 1979, "Safety Closure for Fiber-Optic Devices," pp. 2393-2394.

Primary Examiner—William L. Sikes
Assistant Examiner—Frank González
Attorney, Agent, or Firm—Robert M. Rodrick; Salvatore J. Abbruzzese

[57] ABSTRACT

A closure for optical element terminations, which alternately covers and uncovers the exposed optical element. The closure includes a shroud which covers the housing containing the optical element. The shroud is movable between position opening and closing the optical element, in response to the connection and disconnection of housing.

2 Claims, 4 Drawing Figures

MOVABLE CLOSURE FOR OPTICAL ELEMENTS

This is a continuation of application Ser. No. 332,716, filed Dec. 21, 1981.

FIELD OF THE INVENTION

This invention relates to closures for optical element terminations, and more particularly to the removable closure of the end of an optical fiber in an optical fiber connection.

BACKGROUND OF THE INVENTION

In the coupling of optical elements, an end face thereof is typically exposed so as to be coupled with an end face of a second optical element. In particular with optical fiber connectors, such end faces are commonly formed by cleaving the ends of the optical elements. In the ultimate connection of the elements, a protective sleeve forming a portion of the connector is often provided, such sleeve insulating and protecting the fibers from exposure to the environment. However, when the connectors are not mated, e.g., prior to actual connection or when a change in connection is desired, the cleaved ends are usually exposed. Foreign matter such as dirt, dust or the like can enter the connector, covering or at least partially blocking the end face of optical fiber. This blockage can severely affect the optical transmission capabilities of the connector.

Prior attempts have been made to provide a cover or cap for optical fiber ends for use in a wide variety of applications. These prior devices include shutter-type mechanisms which are activated by external means. While such shutter-type mechanisms effectively serve to block optical transmission between end-to-end optical elements, they provide little protection from outside particles and contaminants. Further, these prior devices are actuated in a separate step apart from that of the connection of the elements. This results in exposure of the optical element prior to connection.

Accordingly, the prior devices, while providing an end cover or shutter for cutting off optical transmission, do not sufficiently cover the end of the fiber so as to protect it from outside contaminants and debris. Further, these known devices do not engage automatically upon disconnection of the optical elements.

SUMMARY OF THE INVENTION

It is an object of the present invention to provide an improved closure for optical element terminations.

It is a further, more particular object to provide a closure for the cleaved end of an optical fiber in a connector, which closes upon disconnection.

These and other objects and features are found in the present invention which looks toward providing a closure for optical element terminations, more particularly in a shroud for an optical fiber connector housing. The shroud is mounted to the connector housing and is movable between two positions: a first position wherein the shroud blocks or covers the optical fiber end; and a second position wherein the shroud uncovers the optical fiber end. The shroud movement is responsive to the interconnection of the connector with a further optical element. The position of the shroud is such that when the connector is connected to a second optical element, say another connector, the fiber end is uncovered for complete optical transmission. Upon disengagement, the shroud moves to a position covering the fiber end, not only blocking optical transmission, but also shielding the fiber end from outside contaminents.

Further embodiments of the shroud are contemplated, including a shroud having an aperture. In covered position the aperture is in non-alignment with the fiber end and in uncovered position, the fiber end and aperture are aligned.

Other objects and features of the invention will be evident from the following detailed description of the accompanying drawings.

DETAILED DESCRIPTION OF THE PREFERRED EMBODIMENTS

Figure 1:
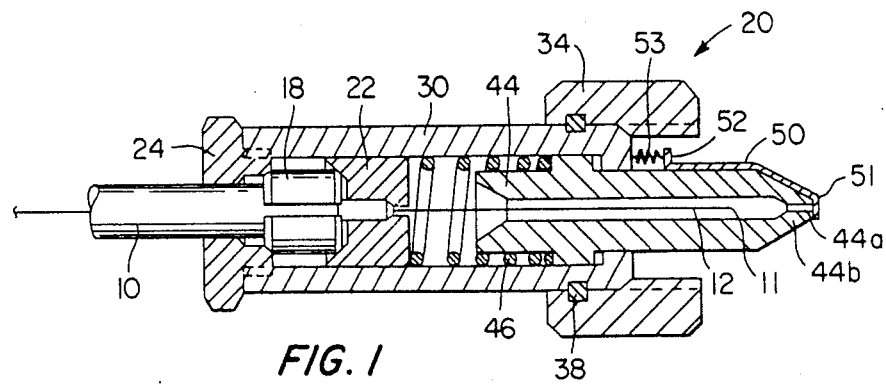
FIG. 1 is a longitudinal cross-sectional view of an optical cable connector, including the shroud of the present invention shown in the normally covering position.

Referring to FIG. 1, there is shown an optical fiber cable connector 20, useful in securing the terminal end of an optical cable 10 for connection with a similar end of a second optical cable, held in a mating connector, not shown.

Cable connectors are disclosed as being preferred examples of practicing the present invention. Not withstanding the preferred environment, the invention disclosed herein is not limited for use with the presently disclosed connector or with any conventional connectors alone, but may be employed with various optical element termination devices. For simplification of description and ease in understanding, the present invention is being described in connection with fiber optic cable connectors such as the type shown and described in pending U.S. Pat. No. 4,378,145, issued Mar. 29, 1983, and assigned to the assignee of the instant application.

Connector 20 is a fiber optic cable connector which terminates a conventional cable 10 including optical fiber 12 for connection with a second optical fiber. The connector 20 includes an outer housing 30 which contains a retainer ring 22, and a surrounding ferrule 18 for accommodating the cable and fiber. An end cap 24 secures the retaining ring and ferrule in place in the housing. A fiber guide 44, also contained in housing 30, accepts the extending fiber 12, securing relative longitudinal orientation. The fiber guide 44 is spring-loaded under the bias of spring 46 situated between fiber guide 44 and retaining ring 22, so as to permit exposure of the fiber end face 11 through end aperture 44a. An internally screw-threaded coupler 34 is rotatably secured to the housing, longitudinally projecting therefrom to form a female receptacle for a second connector-type termination (not shown). Ring 38 secures coupler 34 in a fixed rotative position.

In preferable form, the longitudinal extent (tip 44b) of fiber guide 44 is tapered and terminates at aperture 44a. This permits fiber guide 44 to serve as an insertion-type element to project fiber end face 11 into the desired mating connector.

In accordance with the invention, slidably secured to the outer surface of fiber guide 44 is shroud 50. The shroud 50 is formed of strong, resilient material, preferably beryllium copper or other suitable material that is formed to the shape of the tapered tip 44b of fiber guide 44. In order to conform more readily to the shape of the tapered tip 44b, shroud 50 may be slightly arcuate along its transverse axis. Shroud 50 is secured to the housing so as to have a positional bias. For example, the shroud 50 may be mounted by a spring 53 which would position the shroud normally, as shown in FIG. 1, wherein the outer edge 51 extends over and covers aperture 44a, across the transverse extent of fiber guide 44. It is contemplated that any well-known biasing means may be employed, spring biasing being disclosed only by way of example. A further example would be to form shroud 50 of material having natural biasing tendencies so that the shroud would resiliently recover to the position shown in FIG. 1 upon removal of external forces.

The inner extent (oppositely directed from the outer edge 51) of shroud 50 includes an upwardly depending shoulder 52 which is constructed to abut the outer extent of a second connector housing as described hereinafter.

Figure 2:
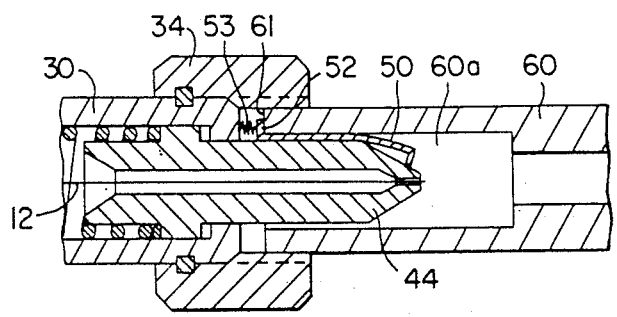
FIG. 2 is a partially fragmented view of the FIG. 1 connector shown connected to a further optical element housing with the shroud in the open position.

FIG. 2 shows the connector of FIG. 1 engaged with and connected to a second optical housing. In the present example, central housing 60 is shown, which can be any simple connector-type termination apparatus for connecting two optical fibers.

Central housing 60 includes a central opening 60a defining an outer annular surface 61 for insertion into the female receptacle formed by coupler 34. Central opening 61 thereby accepts fiber guide 44. The external edge of central housing 60 is screw-threaded for screw-type connection with internally threaded coupler 34 of housing 20.

Having herein described the structure of the present invention, its operation will now be described.

With shroud member 50 in its normal position so that outer edge 51 closes aperture 44a of fiber guide 44, central housing 60 may be inserted into the chamber defined by the coupler 34. Rotation of coupler 34 will force central housing 60 inwardly due to the threaded relation between the members. This inward movement will force outer annular surface 61 to abut shoulder 52 of shroud 50. Further rotation of coupler 34 will impart further inward movement of central housing 60, thereby driving in shoulder 52 and moving shroud 50 from its normal position to a position as shown in FIG. 2, wherein aperture 44a is now exposed. Fiber 12 now is in the connected position.

As can be seen, aperture 44a will remain covered and protected by shroud 50 until ultimate connection takes place. Similarly, upon disconnection, by removal of central housing 60 from coupler 34 and thereby removing the resistance to the biasing tendencies of shroud 50, shroud 50 will return to its normal position covering aperture 44a under the influence of the spring bias 53.

Figure 3:
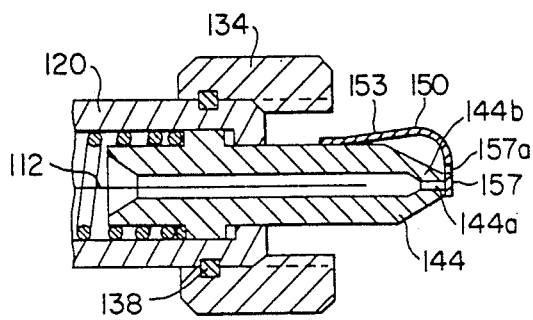
FIG. 3 is a longitudinal cross-sectional view of an optical cable connector including another embodiment of the shroud of the present invention, such shroud being shown in covering position.
Figure 4:
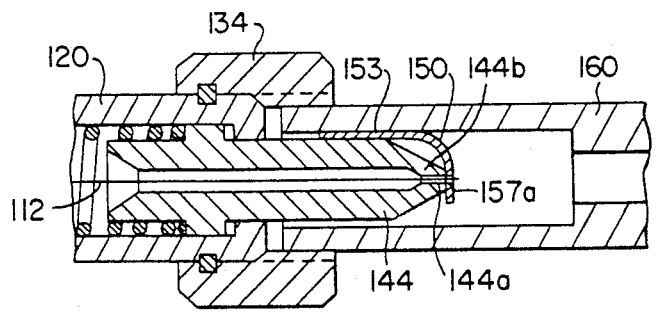
FIG. 4 shows a partially fragmented view of the connector of FIG. 3 being connected to a further optical element housing, the shroud being shown in the open position.

FIG. 3 shows an alternative embodiment of the present invention. The connector, fiber guide, housing etc., are all substantially similar to those described with reference to FIGS. 1 and 2. For simplification of description, with respect to FIGS. 3 and 4, those elements having similar characteristics will be denoted by similar reference numerals by the addition of 100 to the reference numerals of FIGS. 1 and 2. As an example, fiber guide 144 of FIGS. 3 and 4 is similar to Fiber guide 44 of FIGS. 1 and 2.

Shroud member 150 in accordance with this embodiment of the invention as shown in FIG. 3, is substantially "L"-shaped, having a longitudinal portion 153 and a transverse portion 157 extending from the outer edge of longitudinal portion 153. As with shroud 50 of FIGS. 1 and 2, shroud 150 can be arcuate across its transverse length so as to conform to fiber guide 144. Centrally located in transverse portion 157 is an aperture 157a, having an opening which is at least as large as aperture 144a of fiber guide 144.

Shroud 150 is pivotally secured at its longitudinal edge opposite from the transverse portion to the outer surface of fiber guide 144. The longitudinal portion 153 extends substantially along the length of the fiber guide 144 and transverse portion 157 extends transversly across tip 144b. Shroud 150 can be attached to the outer surface of fiber guide 144 by any well known securement means, such as, for example, a spot weld, or solder.

In order to provide the resilient qualities desired, shroud 150 is constructed of material which is known to have natural longitudinal resilience, or the ability to recover its original shape after external pressure is released. As an example, a material such as beryllium copper can be employed which, after being flexed about the pivot point, will return to its original position.

In normal position, shroud 150 is positioned so that the longitudinal member 153 secured at pivot point 153a extends up at an angle as measured from the longitudinal axis of fiber guide 144. Transverse member 157 will then extend down so that the lower edge 157a will cover aperture 144a of fiber guide 144. Thus, aperture 144a and aperture 157a will be non-aligned.

FIG. 4 shows connector 120 connected to central housing 160. Shroud 150, urged downward by central housing 160 is in open position with aperture 157a being aligned with aperture 144a.

With reference to FIGS. 3 and 4, the present modification operates as follows:

Shroud 150 being in normal position as above described, is engaged by the central housing 160 to be connected. The inside wall of central housing 160 abuts the longitudinal extent of shroud 150 and urges the shroud downwardly against the fiber guide 144 upon inward movement of the central housing, occasioned by rotation of coupler 134. When the central housing has been tightly connected to the connector 120, longitudinal portion 153 of shroud 150 will lie relatively flat along the outer surface of fiber guide 144. The corresponding movement of transverse member 157 will cause alignment of aperture 144a and aperture 157a, exposing optical fiber 112 for connection.

Similarly, upon disconnection, i.e., removing the central housing 160, which is holding shroud 150 against fiber guide 144, the resilient tendencies of shroud 150 will return it to its normal position, thereby covering aperture 144a as it is no longer aligned with aperture 157a.

The particularly described embodiments are disclosed by way of example and illustration and are not intended to limit the scope of the invention. The scope of the invention is set forth in the appending claims.

We claim:

1. An apparatus for connecting optical elements comprising:

an elongate housing having a central axial bore extending therethrough for receipt of a terminal end of one said optical elements, said housing including an end portion having an end aperture axially aligned and in communication with said bore;

connecting means inclusive of said one end of said housing for connecting said housing to a second optical element; and a resilient shroud member mounted on said housing, said shroud member having an engagement portion adjacent said bore, adapted to be engaged upon connection of said housing to said second optical element, said shroud being resiliently movable upon engagement of said engagement portion from a first position wherein said bore is closed, thereby preventing entry of contaminents into said bore, to a second position wherein said bore is opened, wherein said shroud member further includes:

a longitudinal portion flexibly mounted at one end at a pivot point on the external surface of said elongate housing;

a transverse portion at the other end of said longitudinal portion extending across said housing aperture, said transverse portion including a shroud aperture disposed to be in non-alignment with said housing aperture in said first position and to be aligned with said housing aperture in said second position.

2. An apparatus in accordance with claim 1 wherein said optical elements are optical fibers and wherein said elongate housing is an optical fiber connector for supporting one of said optical fibers.

* * * * *